US006273728B1

(12) United States Patent
van Meurs et al.

(10) Patent No.: US 6,273,728 B1
(45) Date of Patent: Aug. 14, 2001

(54) LIFE SUPPORT SIMULATION SYSTEM SIMULATING HUMAN PHYSIOLOGICAL PARAMETERS

(75) Inventors: Willem Lambertus van Meurs; Samsun Lampotang; Michael Lowell Good; Tammy Yachabach Euliano, all of Gainesville, FL (US); Joannes E. W. Beneken, Helmond (NL); Ronald George Carovano, Jr.; Michael Franklin Ellis, both of Sarasota, FL (US); James Bradley Azukas, Bradenton, FL (US); Mark Woodson McClure, Parish, FL (US); Nicole Anna Marie de Beer, Amsterdam (NL); Joachim Stefan Gravenstein, Gainesville, FL (US)

(73) Assignee: The University of Florida, Gainesville, FL (US)

( * ) Notice: Subject to any disclaimer, the term of this patent is extended or adjusted under 35 U.S.C. 154(b) by 0 days.

(21) Appl. No.: 08/923,807

(22) Filed: Sep. 4, 1997

(51) Int. Cl.⁷ .................................................. G09B 23/28
(52) U.S. Cl. .......................................... 434/268; 434/262
(58) Field of Search .................................... 434/262, 266, 434/267, 268, 272

(56) References Cited

U.S. PATENT DOCUMENTS

| | | | |
|---|---|---|---|
| 3,520,071 | 7/1970 | Abrahamson et al. ................... | 35/17 |
| 3,562,924 | 2/1971 | Baermann et al. ....................... | 35/17 |
| 3,564,729 | 2/1971 | Ackerman ................................ | 35/17 |
| 3,661,052 | 5/1972 | Lucien et al. ........................... | 91/173 |
| 3,665,087 | 5/1972 | Poylo ....................................... | 35/17 |
| 3,808,706 | 5/1974 | Mosley et al. ........................... | 35/17 |
| 3,840,009 | 10/1974 | Michaels et al. ...................... | 128/260 |
| 3,849,909 | 11/1974 | Ravin ..................................... | 35/17 |
| 3,888,020 | 6/1975 | Krause .................................... | 35/17 |
| 3,935,410 | 1/1976 | Howard ................................. | 200/332 |
| 4,167,070 | 9/1979 | Orden ..................................... | 35/17 |
| 4,264,312 | 4/1981 | Cianci .................................... | 434/262 |
| 4,561,851 | 12/1985 | Ferreira et al. ........................ | 434/272 |
| 4,570,640 | 2/1986 | Barsa ..................................... | 128/741 |
| 4,853,521 | 8/1989 | Claeys et al. .......................... | 235/375 |
| 4,878,388 | 11/1989 | Loughlin et al. ...................... | 73/866.4 |
| 4,907,973 | 3/1990 | Hon ....................................... | 434/262 |
| 4,978,823 | 12/1990 | Sato et al. ............................. | 200/437 |
| 4,996,980 | 3/1991 | Frankenberger et al. .......... | 128/200.24 |
| 5,006,050 | 4/1991 | Cooke et al. .......................... | 417/478 |
| 5,199,877 | * 4/1993 | Page ..................................... | 434/262 |
| 5,215,469 | 6/1993 | Kohnke et al. ....................... | 434/268 |
| 5,314,339 | 5/1994 | Aponte ................................. | 434/267 |
| 5,348,270 | 9/1994 | Dinh ..................................... | 251/61.1 |
| 5,385,474 | 1/1995 | Brindle ................................. | 434/267 |
| 5,391,081 | 2/1995 | Lampotang et al. ................. | 434/262 |
| 5,397,237 | 3/1995 | Dhont et al. ......................... | 434/262 |
| 5,403,192 | 4/1995 | Kleinwaks et al. .................. | 434/272 |
| 5,509,810 | 4/1996 | Schertz et al. ....................... | 434/262 |
| 5,584,701 | 12/1996 | Lampotang et al. ................. | 434/272 |
| 5,769,641 | * 6/1998 | Lampotang et al. ................. | 434/272 |
| 5,772,442 | 6/1998 | Lampotang et al. ................. | 434/265 |
| 5,772,443 | 6/1998 | Lampotang et al. ................. | 434/272 |
| 5,779,484 | 7/1998 | Lampotang et al. ................. | 434/266 |
| 5,800,178 | * 9/1998 | Gillio .................................... | 434/272 |
| 5,853,292 | * 12/1998 | Eggert et al. ........................ | 434/266 |

OTHER PUBLICATIONS

"A Computer–Controlled Patient Simulator", J.S. Denson, MD and Stephen Abrahamson, PhD.JAMA, (Apr. 21, 1969), vol. 208, No. 3, pp. 504.08.

"Human Simulation for Training in Anesthesiology", Stephen Abrahamson, Medical Engineering, pp. 370–374 (Year Book Medical Publishers, Inc. 1974).

"A Lung Model of Carbon Dioxide Concentrations with Mechanical or Spontaneous Ventilation", Lampotang, et al., Critical Care Medicine, vol. 14, No. 12, pp. 1055–1057.

"Critical Events Simulation for Training in Anesthesiology", Good, et al. Journal of Clinical Monitoring, vol. 4, No. 2, p. 140 (Apr. 1988).

"A Comprehensive Anesthesia Simulation Environment: Re–creating the Operating Room for Research and Training", David M. Gaba, M.D.; Abe DeAnda, B.S. Anesthesiology, 69:387–394 (1988).

"Hybrid Lung model for Use in anesthesia Research and Education", Good et al., Anesthesiology, V 71, No. 3A, p. A982 (Sep. 1989).

"Anesthesia Simulators and Training Devices," Good et al., Reprinted from International Anesthesiology Clinics, vol. 27, No. 3, pp. 161–164 (Fall 1989).

"Servo–Controlled Closed–Circuit Anaesthesia, A Method for the Automatic Control of Anesthesia Produced by a Volatile Agent in Oxygen", J.A.S. Ross et al., British Journal of Anaesthesia, vol. 55, pp. 1053–1060 (1983).

Asymptomatic Cardiomyopathy Presenting as Cardiac Arrest in the Day Surgical Unit, C. William Hanson, III, M.D., Anesthesiology, 71:982–984 (1989).

* cited by examiner

Primary Examiner—Sam Rimell

(57) ABSTRACT

Method and apparatuses for simulating life support procedures in real-time using a mannequin. The apparatuses and methods are operable for a number of therapeutic interventions and provide for a number of appropriate simulated physiological and pharmacological responses. Included interventions are chest displacement, the application of gas pressure to the upper airway, inspiratory gas composition, administration of a fluid, or administration of intravenous drugs. These interventions provide a variety of appropriate responses (and misapplication of an intervention by a trainee provides a corresponding appropriate response).

15 Claims, 5 Drawing Sheets

LIFE SUPPORT SIMULATION SYSTEM SIMULATING HUMAN PHYSIOLOGICAL PARAMETERS

BACKGROUND OF THE INVENTION

I. Field of the Invention

The present invention relates to medical simulation. In particular, the present invention relates to life support simulation apparatuses capable of responding realistically to therapeutic interventions.

II. Background of the Invention

The goal of Life Support ("LS") in case of a cardiac arrest is to partially assist (in the case of heart or respiratory failure) or completely assume (in the case of cardiac or respiratory failure) the function of the heart and lungs in providing perfusion of oxygenated blood to the brain, heart, kidney, liver, and other vital organs. In the case of cardiac or respiratory arrest the goal of life support therapy is to restore spontaneous breathing and cardiac rhythm. Life support therapy takes many different forms and is administered according to a variety of clinical protocols, guidelines, algorithms, including Basic Life Support ("BLS"), Advanced Cardiac Life Support ("ACLS"), and Advanced Trauma Life Support ("ATLS"), for example. These different forms of life support are utilized by many health care professionals, including emergency medical technicians, paramedics, and physician nurses, and health care technicians who work in the emergency department, intensive care units, operating rooms, and other acute care settings in the hospital. Representative therapies include, but are not limited to, external cardiac massage ("chest compression"), artificial ventilation, and fluid and drug administration.

The return of a cardiac Thythm can be evaluated in several ways, including palpation of peripheral pulses, auscultation of heart sounds, measurement of systemic blood pressure, assessment of the electrocardiogram, and with data from the pulse oximeter. The return of spontaneous breathing can be evaluated in several ways, including assessment of gas movement, observation of chest movement, auscultation of breath sounds, measurement of respiratory carbon dioxide with a capnograph, and with data from a pulse-oximeter. The return of cardiac rhythm, spontaneous breathing and the successful perfusion and oxygenation of the brain depends on the physiologic state of the patient and on the combined effect of the therapeutic interventions. Several interacting physiologic and pharmacologic subsystems play a role in this determination, including the cardiovascular, pulmonary, systemic gas uptake and distribution, drug transport (pharmacokinetics), drug effects (pharmacodynamic), and oxygen supply-demand balances in the heart and brain.

Health care professionals face many challenges in leaning and practicing life support therapies. The environment is often new and unfamiliar and usually involves the use of technologically advanced medical instruments and devices. Mistakes can threaten the life of the critically ill patient, so learning by "hands-on" experience is difficult (and difficult to justify). The life support system described herein allows for the repeated practice of life support interventions and protocols, without risk to real patients. The invention elaborates on a full-scale human patient simulator ("HPS") by adding external cardiac massage capabilities and providing the physiological and pharmacological models to simulate the patient's responses to this and other life support therapeutic interventions.

A major benefit of an integrated HPS is that it allows realistic action/reaction interplay between the actions of the trainee, responses of the simulated patient, data shown on the monitors and subsequent actions by the trainee. Another feature of the HPS is that its software and hardware reflect the self-regulating aspects of human physiology. For instance, in a non-self-regulating system, an awkward input situation would invariably lead to physiologically implausible behavior from the system or such stimuli would result in an inability of the system to handle the input at all. A self-regulating system is more robust in the accommodation and simulation of unplanned events because it will still provide an appropriate response.

SUMMARY OF THE INVENTION

The present invention involves enhancements to a patient simulator of the kind generally disclosed in U.S. Pat. No. 5,391,081 and 5,584,701, the contents of both of which are hereby incorporated herein by this reference.

The present invention provides a method for simulating the above-referenced life support procedures in real-time using a mannequin, the method comprising sensing thorax or abdomen displacement on a mannequin and generating a variable corresponding to the extent of the displacement, determining, based on a time driven script, an event driven script, a mechanical model, a mathematical model or a combination thereof an appropriate physiological response to the variable corresponding to the thorax or abdomen displacement, and based on the appropriate physiological response, actuating at least one output Also provided is a method for simulating life support procedures in real-time using a mannequin, the method comprising sensing the alveolar gas volume that results from gas pressure applied to an upper airway of the mannequin and generating a variable that corresponds to the alveolar volume or the alveolar ventilation, determining, based on a time driven script, an event driven script, a mechanical model, a mechanical model, a mathematical model or a combination thereof an appropriate physiological response to the variable corresponding to the alveolar volume or the alveolar ventilation, and based on the appropriate physiological response, actuating at least one output.

The present invention also presents a method for simulating life support procedures in real-time using a mannequin, the method comprising sensing the composition of inspiratory or alveolar gas and generating a variable corresponding to the gas composition, determining, based on a time driven script, an event driven script, a mechanical model, a mathematical model or a combination thereof an appropriate physiological response to the variable corresponding to the gas composition, and based on the appropriate physiological response, actuating at least one output.

The invention also provides a method for simulating life support procedures in real-time using a mannequin, the method comprising sensing the amount and composition of administered fluid and generating a variable corresponding to the type of the fluid and the administered amount, determining, based on a time driven script, an event driven script, a mechanical model, a mathematical model or a combination thereof an appropriate physiological response to the variables corresponding to the type and the amount of the fluid, and based on the appropriate physiological response, actuating at least one output.

The invention also provides a method for simulating life support procedures in real-time using a mannequin, the method comprising sensing the administration of intravenous drugs and generating variables corresponding to the type of the drug and the administered dose, determining, based on a time driven script, an event driven script, a mechanical model, a mathematical model or a combination thereof an appropriate pharmacological response to the variables corresponding to the drug type and the administered dose, and based on the appropriate pharmacological response, actuating at least one output.

In another embodiment, the invention provides an apparatus for simulating life support procedures in real-time using a mannequin, the apparatus comprising a mannequin having a thorax or abdomen region, a sensor for sensing thorax or abdomen displacement on the mannequin and generating a variable corresponding to the extent of the displacement, an electronic device operable in accordance with a time driven script, an event driven script, a mechanical model, a mathematical model or a combination thereof for determining an appropriate physiological response to the variable corresponding to the thorax or abdomen displacement, and at least one output corresponding to the appropriate physiological response.

In another embodiment, the invention provides an apparatus for simulating life support procedures in real-time using a mannequin, the apparatus comprising a mannequin having an upper airway, a sensor for determining the alveolar gas volume that results from gas pressure applied to the upper airway of the mannequin and generating a variable that corresponds to the alveolar volume or the alveolar ventilation, an electronic device operable in accordance with a time driven script, an event driven script, a mechanical model, a mathematical model or a combination thereof for determining an appropriate physiological response to the variable corresponding to the alveolar volume or the alveolar ventilation, and at least one output corresponding to the appropriate physiological response.

In a further embodiment, the invention provides an apparatus for simulating life support procedures in real-time using a mannequin, the apparatus comprising a mannequin having an airway, a sensor positioned in fluid communication with the airway for sensing the composition of inspiratory or alveolar gas and generating a variable corresponding to the gas composition, an electronic device operable in accordance with a time driven script, an event driven script, a mechanical model, a mathematical model or a combination thereof for determining an appropriate physiological response to the variable corresponding to the gas composition, and at least one output corresponding to the appropriate physiological response.

In yet another embodiment, the invention provides an apparatus for simulating life support procedures in real-time using a mannequin, the apparatus comprising a mannequin having a means for accepting an administered fluid, a sensor for sensing the amount and composition of administered fluid administered to the accepting means and generating a variable corresponding to the type of the fluid and the administered amount, an electronic device operable in accordance with a time driven script, an event driven script, a mechanical model, a mathematical model or a combination thereof for determining an appropriate physiological response to the variables corresponding to the type and the amount of the fluid, and at least one output corresponding to the appropriate physiological response.

Also, the invention provides an apparatus for simulating life support procedures in real-time using a mannequin, the apparatus comprising a mannequin having a means for accepting administered intravenous drugs, a sensor for sensing the administration of intravenous drugs and generating variables corresponding to the type of the drug and the administered dose, an electronic device operable in accordance with a time driven script, an event driven script, a mechanical model, a mathematical model or a combination thereof for determining an appropriate pharmacological response to the variables corresponding to the drug type and the administered dose; and at least one output corresponding to the appropriate pharmacological response.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE PREFERRED EMBODIMENTS

Figure 1:
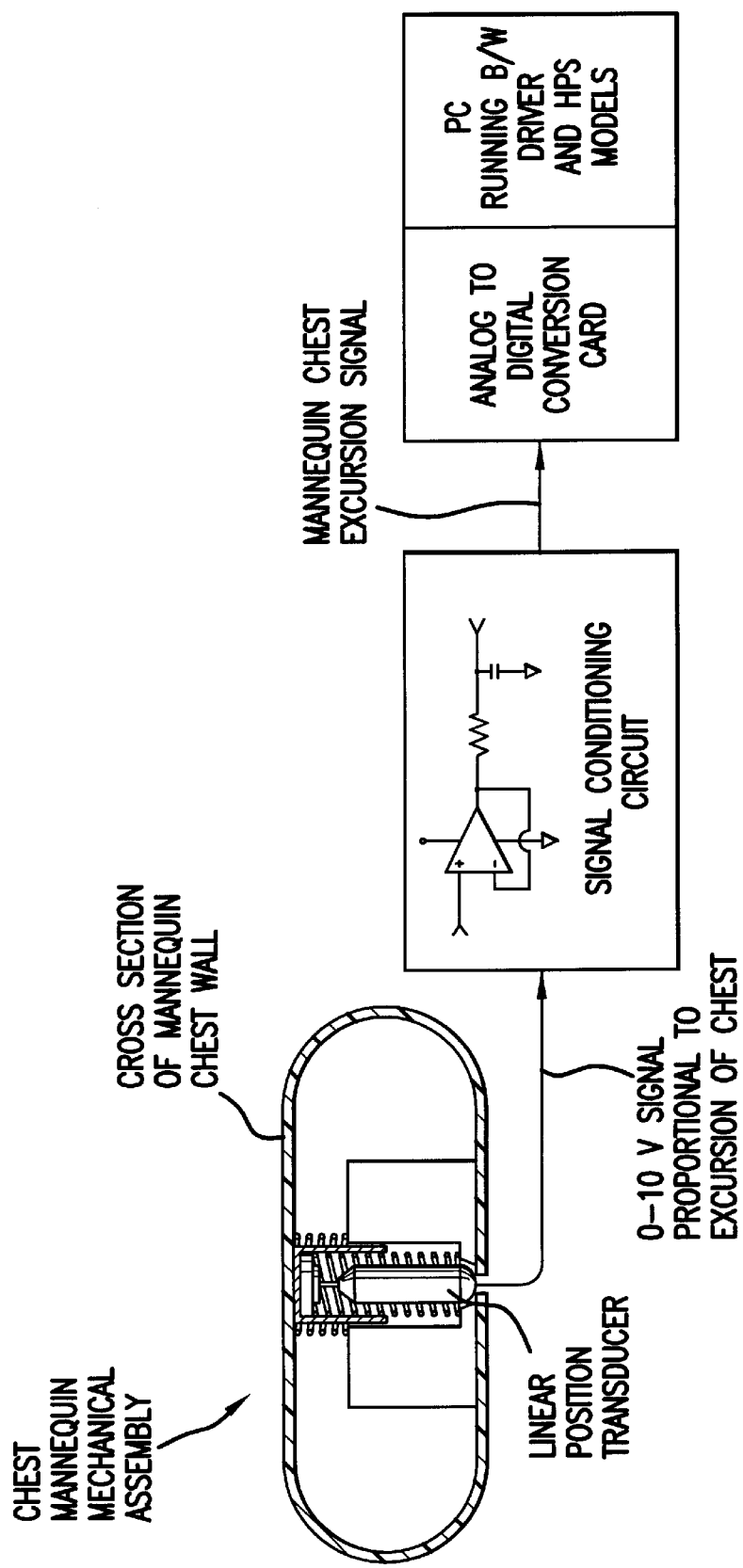
FIG. 1 is a block diagram of the chest compression measurement apparatus of the invention.

The present invention may be understood more readily by reference to the following detailed description of preferred embodiments of the invention and the Figures.

Before the present methods and app es are disclosed and described, it is to be understood that the terminology used herein is for the purpose of describing particular embodiments only and is not intended to be limiting. It must be noted that, as used in the specification and the appended claims, the singular forms "a," "an" and "the" include plural referents unless the context clearly dictates otherwise.

Human Patient Simulators ("HPS") are state-of-the-art learning systems which help a wide variety of medical practitioners and students learn the diagnosis and management of clinical problems without risk to real patients.

Script-controlled and Model-driven Simulation

Most clinical learning objectives in critical care have in common the need for realistic cardiovascular and respiratory responses to intravenous fluid management, artificial mechanical ventilation of the lungs, and drug administration, both in normal and pathophysiological situations. Two basic approaches to generating these simulated patient responses automatically (without the intervention of a simulation director) are contemplated.

The first is a simulation script, a set of commands that cause the patient simulator to operate in a specified manner. The script must anticipate actions and interventions by the trainee and simulate the patient's physiological response. The script-driven approach has the advantage of being explicit and unequivocal with respect to generated responses. Scripts can describe responses to events that can be characterized by their occurrence and time sequence, for example, laryngoscopy, endotracheal intubation, and aortic clamping. The influence of one single management variable, for example, the cardiopulmonary side effects of an intravenous hypnotic, can still be taken into account by using a script In this case, the script has to "spell out" responses to fine increments of the administered dose. The script can, for example, specify that laryngoscopy following a small ("inadequate") dose of hypnotic results in tachycardia and increased blood pressure while an excessive dose ("overdose") of hypnotic results in decreased blood pressure. In a similar way, the evolution and influence of a single internal variable can be simulated using a script, for example, the onset and expansion of a pneumothorax and its influence on chest movement and gas exchange. Some of the dynamic (time) aspects of patient responses to therapy can also be taken into account by a script. In general however, a scripted simulation cannot be designed to anticipate all possible management options, all possible, and potentially valid, dosing schemes (repeated boluses and infusions) devised by different trainees, nor sort out the cardiovascular and respiratory responses to each of them.

Model-driven simulation, as opposed to script controlled simulation, has the potential to represent management variables as continuous values that change with time. More importantly, model-driven simulation can more readily be designed to react to the multitude of management options, and to represent the possible interactions between different physiologic subsystems. Consider the multiple management options for hypotension: intravenous fluid management, patient position, cardiac inotropes, and peripheral vasoconstrictors. The different responses not only depend on the timing, magnitude, and combination of the management variables, but also on the underlying cause of the hypotension. Scripting of all possible responses is virtually impossible. Another illustrative example is the rebreathing of $CO_2$, which causes an increased alveolar partial pressure of $CO_2$ ($pCO_2$) that influences the systemic uptake and distribution of that gas in the body tissues. This leads to a higher $pCO_2$ in the brain, and if the $CO_2$ response is not blunted by a respiratory depressant (depending on pharmacolinetics, pharimacodynamics, and control of breathing), the higher $pCO_2$ will result in an increased ventilatory drive. This, in turn, causes an increased respiratory muscle pressure, which results in larger fluctuations of the intrathoracic pressure and, thereby, influences the central and systemic blood pressures, which can then activate the baroreflex, and generate a respiratory sinus arrhythmia It is difficult to imagine how this chain of potential reactions and interactions between physiologic subsystems, which results from numerous continuous management variables, can be implemented by a script, or for that matter, foreseen by a simulation director in real time.

Control of patient simulators by scripts alone has gradually been enhanced by a combination of mechanical [hardware] and mathematical [software] models. Integrated models of human physiology and pharmacology are a viable solution to the problem of creating realistic responses to a multitude of dynamically interacting continuous variables. Combining the convenient aspects of script control with the power of model-driven simulation, the full-scale patient simulator of the present system has an engine consisting of integrated physiological models with independent variables and parameters that can be controlled by an instructor, either in real time through a console or via an educational exercise specific script file.

Interfacing Mechanical and Mathematical Models to the Environment

Physiologic and pharmacologic models allow for automatic determination of the simulated patient responses to user actions and therapeutic interventions. To create a functional simulator system, these models are interfaced to the user and to real world equipment, which can be accomplished with either realistic physico-chemical interfaces, or with artificial interfaces.

The use of real physico-chemical entities, such as electrical current for the electrocardiogram and real gases for the simulated lung, adds significant realism to full-scale simulation, enabling the simulator to interface with standard, real world medical equipment, such as monitoring instruments, mechanical ventilators, and other life support systems. An alternative method is to sense therapeutic interventions, and to stimulate monitors artificially, electrically, or electro-mechanically. For most educational applications, the preferred form of creating clinical signs, such as heart and breath sounds, chest movement, and skin temperature, is through use of real physical entities such as actual sound, movement, and heat, respectively. This allows the trainee to use their own senses. Emulation using a multi-media computer, and alpha-numerical display are two alternative artificial interface modalities that can also be used for clinical signs.

Some of the physico-chemical interfaces serve as mere input or output devices to mathematical models. In general, hybrid models are designed to simulate essential physiologic system dynamics and to directly provide a physico-chemical interface to the environment.

Model Types

Models useful for carrying out the simulation of the present invention can be hardware or software. Model-driven simulation, as opposed to script controlled simulation, has the potential to represent management variables as continuous values that change with time. More importantly, model-driven simulation can more readily be designed to react to the multitude of management options, and to represent the possible interactions between different physiologic subsystems. Consider the multiple management options for hypotension: intravenous fluid management, patient position, cardiac inotropes, and peripheral vasoconstrictors. The different responses not only depend on the timing, magnitude, and combination of management variables, but also on the underlying cause of the hypotension. Scripting of all possible responses is virtually impossible. Another illustrative example is the rebreathing of $CO_2$, which causes an increased alveolar partial pressure of $CO_2$ ($PCO_2$) that influences the systemic uptake and distribution of that gas in the body tissues. This leads to a higher $PCO_2$ in the brain, and if the $CO_2$ response is not blunted by a respiratory depressant (depending on pharmacokinetics, phannacodynamics, and control of breathing), the higher $PCO_2$ will result in an increased ventilatory drive. This, in turn, causes an increased respiratory muscle pressure, which results in larger fluctuations of the intrathoracic pressure and, thereby, influences the central and systemic blood pressures, which can then activate the baroreflex, and generate a respiratory sinus arrhythmia It is difficult to imagine how this chain of potential reactions and interactions between physiologic subsystems, which results from numerous continuous management variables, can be implemented by a script alone, or for that matter, foreseen by a simulation director in real time.

Control of simulators by scripts is, therefore, enhanced by a combination of a mechanical and mathematical models.

Integrated models of human physiology and pharmacology are and alternative solution to the problem of creating realistic responses to a multitude of dynamically interacting continuous variables. Combining the convenient aspects of script-control with the power of model-driven simulation, the simulator of the present invention has an engine consisting of integrated mathematical models with independent variables and parameters that can be controlled by an instructor, either in real time through a console or via an educational exercise specific script file. This design is referred to as "script-controlled, model-driven" simulation.

Sometimes it is possible to derive a mathematical model by deduction only, based on the underlying physical laws and known parameters. Such a model is called a white box model. In other situations, almost no prior information is available, and the model has to be derived from the measured data of input and output signals, without any information concerning the internal structure and internal relations. These models are called black box models. Medical education simulators are generally "gray box" models; some, but not all, model structures and parameters are derived from physical (anatomic, physiologic, pharmacologic) knowledge. Other parameters need to be adjusted or derived experimentally. As a general rule, the white box models respond more realistically to a wider range of input variables, and are better suited to represent interactions with other models.

Implementation

A. Chest Compression

As noted above, the present invention provides a method for simulating life support procedures in real-time using a mannequin, the method comprising sensing thorax or abdomen displacement on a mannequin and generating a variable corresponding to the extent of the displacement, determining, based on a time driven script, an event driven script, a mechanical model, a mathematical model or a combination thereof an appropriate physiological response to the variable corresponding to the thorax or abdomen displacement, and based on the appropriate physiological response, actuating at least one output. The time driven script, event driven script, mechanical model, mathematical model, or a combination thereof of the determining step further may include accounting for one or more of the elastic characteristics of sternum, rib-cage, diaphragm, or abdomen. In addition, the determining step may include accounting for the intrathoracic pressure from the extent of the displacement, a simulated lung volume, a simulated respiratory muscle pressure, or a combination thereof.

This method, and the other methods and apparatuses of the invention, may be used to trigger a variety of simulated physiological responses. In particular, the appropriate physiological or pharmacological response can be any one or more of the following:

simulated intravascular blood pressures (by sending electrical signal patterns to an invasive or non-invasive blood pressure monitor);

simulated electrocardiogram (by sending electrical signal patterns to positioned electrodes);

simulated heart sounds (by actuating speakers positioned on the mannequin);

simulated carotid, femoral or radial pulses (by pneumatic actuation of tubes positioned under the appropriate skin region of the mannequin);

simulated cardiac output (by sending electrical signals to a cardiac output monitor);

simulated chest movement (by mechanically moving the chest of the mannequin);

simulated gas pressures and flows in and out of trachea by expelling gases from bellows representing the alveolar space);

simulated breath sounds (also by actuating speakers positioned on the mannequin);

simulated end-tidal $CO_2$ (by controlling gas composition in the alveolar space with mass flow controllers and expelling gases from bellows representing the alveolar space);

simulated oxyhemoglobin saturation (by sending electrical signals to a device interfaced with a pulse oximeter probe, where the device emits red and infrared light patterns that stimulate the probe);

simulated arterial and venous blood gases (by displaying alphanumerical simulated blood gas partial pressures on a monitor);

simulated skin color (by using liquid crystal technology on a portion of the skin of the mannequin);

simulated thumb twitch (by actuating a thumb twitching apparatus according to an appropriate protocol)

simulated electroencephalogram (by sending electrical signal patterns to positioned electrodes on the head of the mannequin);

simulated eye signs (by using liquid crystal technology in the eye region of the head of the mannequin);

or a combination thereof.

Moreover, the simulated intravascular blood pressures can be intrathoracic arterial, extrathoracic arterial, vessel rich, muscle and skin, fat, extrathoracic venous, intrathoracic venous, right atrial, right ventricular, pulmonary arterial, lung tissue, pulmonary venous, left atrial, left ventricular blood pressures, or a combination thereof These pressures are simulated by sending electrical signal patterns to an invasive or non-invasive blood pressure monitor.

In one embodiment, simulated carotid, femoral or radial pulses are generated only if the level of arterial pressure exceeds a predetermined threshold.

In another embodiment, the invention provides an apparatus for simulating life support procedures in real-time using a mannequin, the apparatus comprising a mannequin having a thorax or abdomen region, a sensor for sensing thorax or abdomen displacement on the mannequin and generating a variable corresponding to the extent of the displacement, an electronic device operable in accordance with a time driven script, an event driven script, a mechanical model, a mathematical model or a combination thereof for determining an appropriate physiological response to the variable corresponding to the thorax or abdomen displacement, and at least one output corresponding to the appropriate physiological response.

Chest Excursion Sensing Mechanism

Referring now to FIG. 1, the Chest Compression Measurement Apparatus senses thorax or abdomen excursion of a simulated patient, e.g. a mannequin, as it is displaced during performance of chest compressions, a component of Cardiopulmonary Resuscitation (CPR), and communicates the excursion to the human patient simulator's ("HPS") physiologic models. The apparatus supports a thorax displacement of 2" in accordance with American Heart Association guidelines. See "1996 Handbook of Emergency Cardiac Care for Healthcare Providers," p. 3, Mosby Life Line.

The Mannequin

A mannequin with an elastic, flexible torso and chest provides a physical representation of the patient undergoing CPR. It houses the Chest Compression Mechanical Assembly (see below) as well as devices which detect life support interventions in real time, simulate response to therapeutic interventions and actuate the outputs in accordance with the descriptions herein.

The Linear Position Transducer (LPT)

Figure 2:
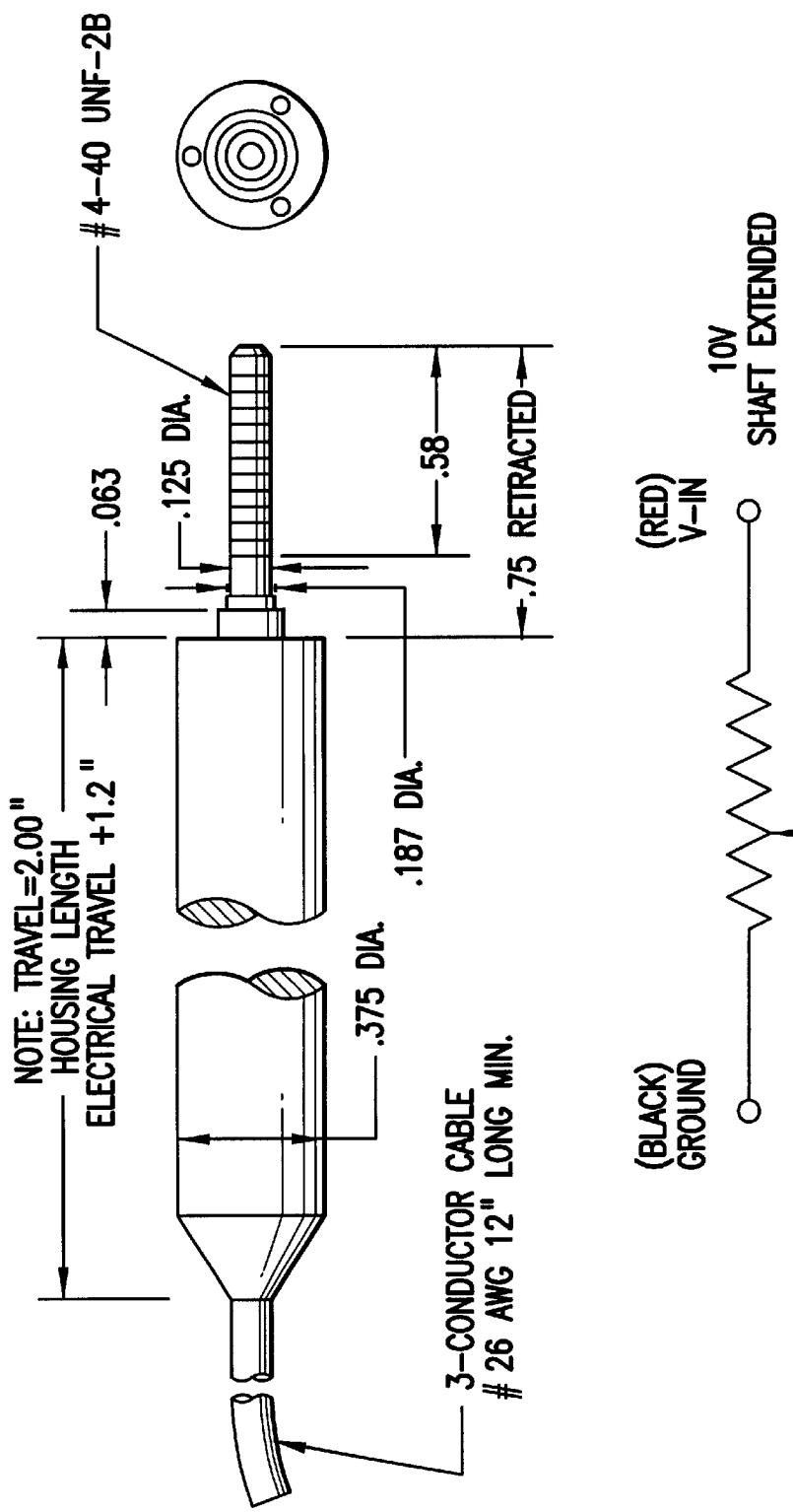
FIG. 2 is a schematic diagram of the linear position transducer useful for implementing the chest compression measurement of the present invention.

The LPT generates a voltage signal proportional to absolute linear position of the mannequin's sternum. The LPT is a small diameter, rugged, resistive linear position sensor. A pair of precious wipers in contact with a continuous resistive flmn, with a resistance of 1500 Ω/inch, compose a voltage divider as depicted in FIG. 2 below. Displacement of the wipers varies the divided voltage in proportion to the displacement. The output voltage of the LPT is applied at the input of the Signal Conditioning Circuit (See Signal Conditioning Circuit below).

The Chest Compression Mechanical Assembly

Figure 3:
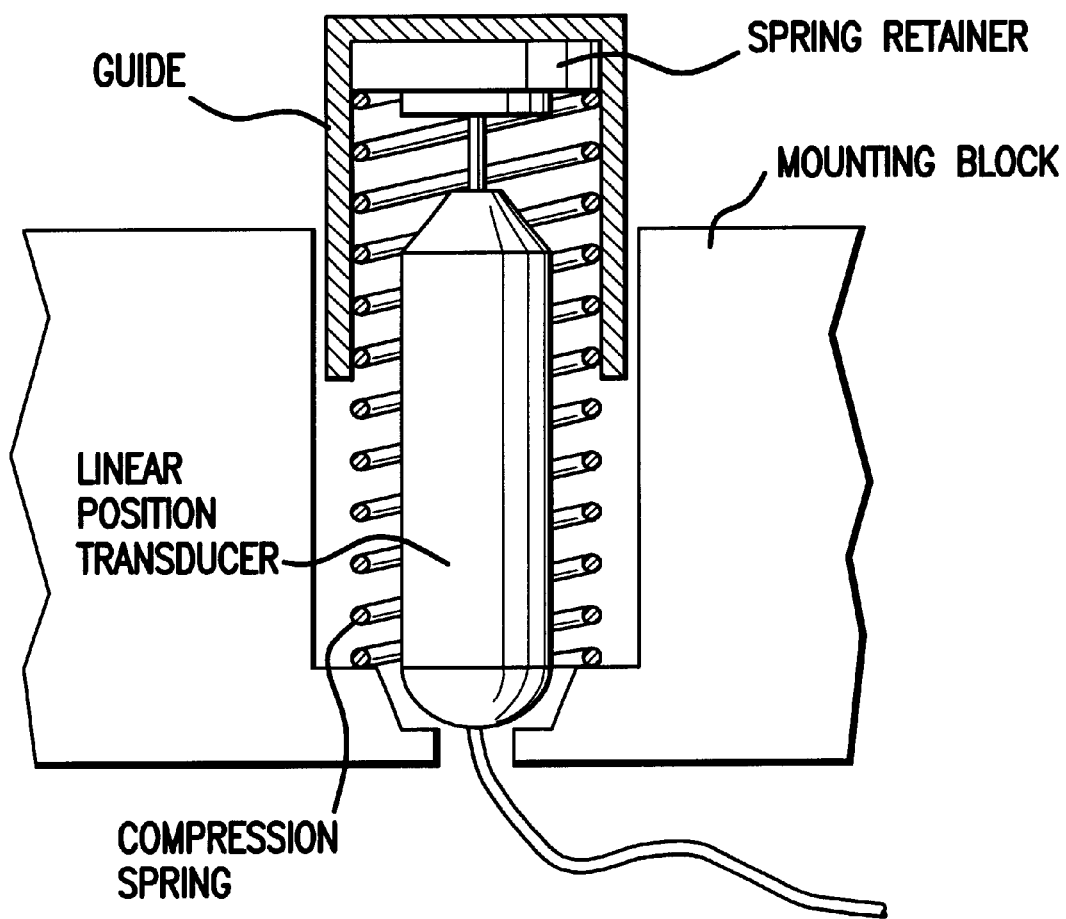
FIG. 3 is a schematic view of the mechanical assembly of the chest compression measurement apparatus of the invention.
Figure 4:
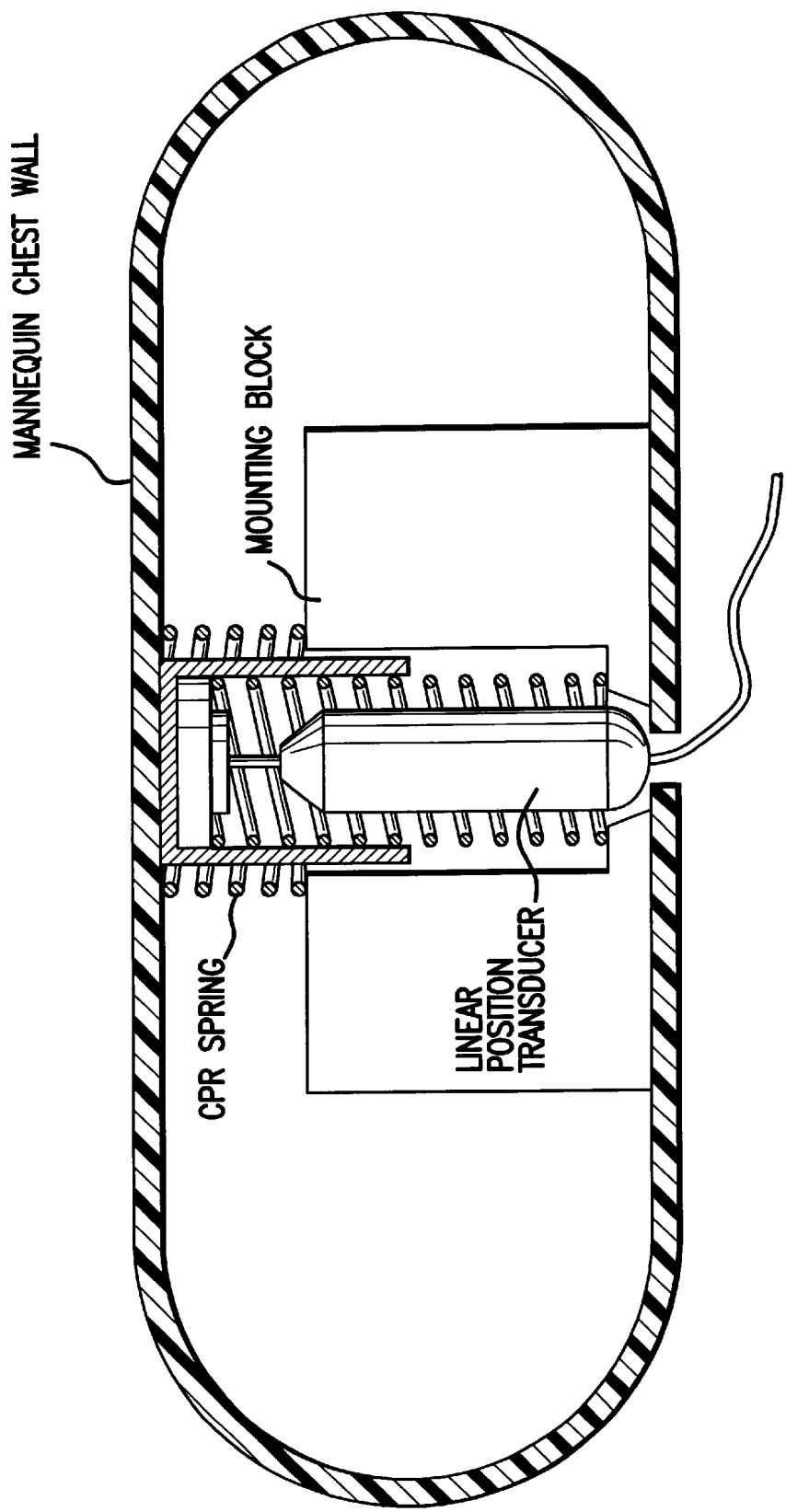
FIG. 4 is a cut-away side view of a patient simulator showing the chest compression apparatus in place.

The Chest Compression Mechanical Assembly integrates the LPT into the mannequin's chest as depicted in FIGS. 3 and 4 below. A counterbore machined into a plastic mounting block houses the LPT with the shaft of the LPT oriented towards the anterior chest of the mannequin. Electrical connections to the LPT are made through the bottom of the counterbore in which the LPT sits. A compression spring, also housed within the counterbore, has a diameter which fits over the outside of the LPT and inside the counterbore without interference. The Spring Retainer attaches to the threaded LPT shaft and retains the spring under compression within the counterbore. The shaft of the LPT is, thus, pushed by the spring to its extended position. A Guide fits over the entire assembly and prevents the coils of the compression spring from interfering with the edges of the counterbore as the spring is compressed and extended during performance of CPR. The Guide is of a length such that it reaches the limit of its travel within the counterbore before the LPT shaft reaches the limit of its respective travel as the Guide is displaced during performance of chest compressions. This prevents damage to the internal mechanism of the LPT.

The Chest Compression Mechanical Assembly is located within the mannequin's chest as depicted in FIG. 4 below. The LPT is located just above the sternal notch of the mannequin's chest so as to accurately measure chest compressions performed according to American Heart Association guidelines. A second compression spring, concentric to the Guide and compressed between the interior, anterior chest wall and the Mounting Bloc, increases the spring constant of the mannequin's chest to simulate that of a human patient.

Signal Conditioning Circuit

Figure 5:
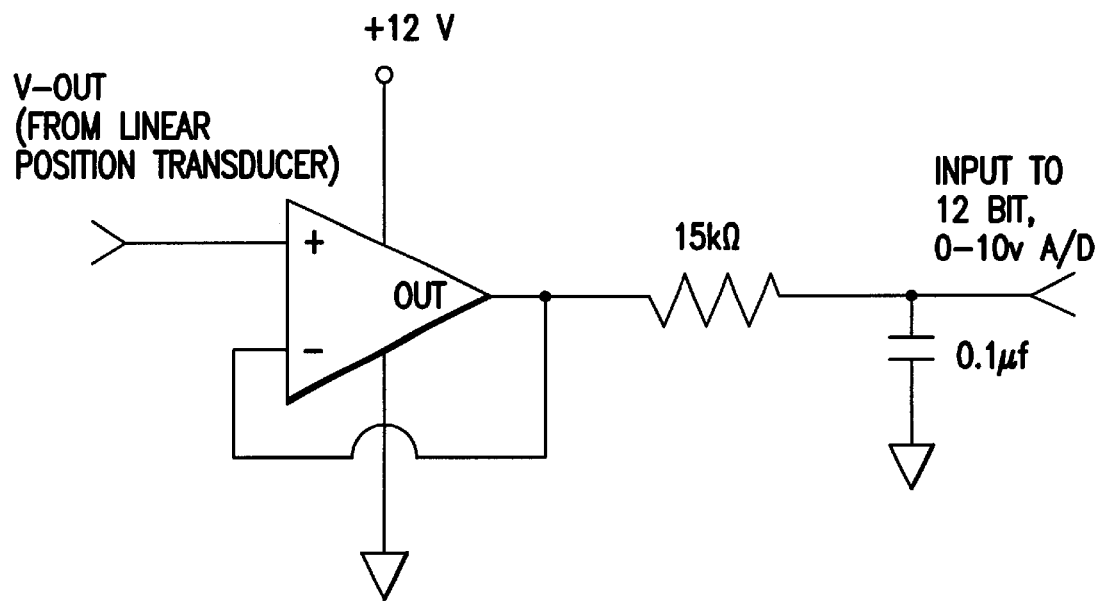
FIG. 5 is a circuit diagram of the signal processing circuit used in conjunction with the linear position transducer of the chest compression measurement apparatus of the invention.

The Signal Conditioning Circuit has two functions. It provides a regulated 10 volt DC reference to the Linear Position Transducer and it buffers the high-impedance LPT output to a single pole low-pass filter. The filter's cutoff frequency of 100 Hz attenuates any signal/noise not associated with the performance of chest excursions. This conditioned signal, which is proportional to the displacement of the Chest Excursion Mechanical Assembly, is sent to the computer's data acquisition card. A schematic of this circuit is shown in FIG. 5.

Data Acquisition Card

This PC card provides 8 channel, 12 bit A/D conversions. One channel of this card is dedicated to converting the 0–10V chest displacement signal to a digital value used by the Software Driver.

Software Driver

The Human Patient Simulator (HPS) software design includes a Hardware Abstraction Layer (HAL), which implies that a layer of secondary software exists between the primary HPS application and the hardware to which it connects. This implementation allows the software components that comprise the HAL to be replaced as necessary without comprising the functionality of the main application. The programs that exist in the HAL are called drivers. This section describes that functionality of the Chest Compression Apparatus Driver.

The Chest Compression Apparatus Driver informs the HPS application of momentary changes in the amount of chest compression. Having received this data, the application then routes it to its physiologic model, which, in turn, incorporates it into computations affecting the patient's modeled cardiovascular and other systems.

The Data Acquisition Card is connected to the LPT and stores the LPT's signal as a digital value. It is the responsibility of the Chest Compression Apparatus Driver's hardware-dependent component to read this value form the data acquisition card. Once the data acquisition card has been read, the driver can convert the value to a number that can be expressed as centimeters of compression, and sends it to the main HPS application.

Mathematical Model for the Physiologic Consequences of Chest Compression

Figure 6:
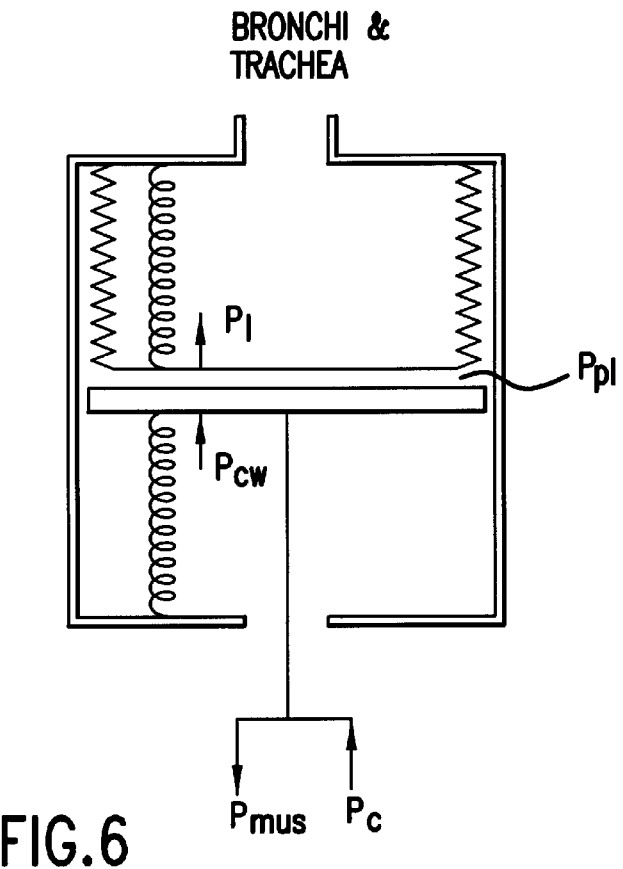
FIG. 6 is a schematic overview of the forces forming part of the lung model useful in practicing the present invention.

Pc is the equivalent pressure (in $cmH_2O$) on the chest wall resulting from a chest compression. In a semi-static situation, Pc is in equilibrium with the intrapleural pressure Ppl, the chest wall compliance pressure Pcw, and the pressure resulting from respiratory muscle activity Pinus (all in $cmH_2O$), FIG. 6.

For the purposes of the present invention, the following assumptions have been made. First, the effect of compression pressure Pc and the respiratory muscle activity Pmus on the chest wall is additive, ignoring the inhomogeneous transfer of chest compression to heart and lungs, and the inhomogeneous chest wall compliances: diaphragm, rib cage, and sternum. Also, the effect of chest compression on the circulation is exclusively mediated by the intrathoracic pressure effect on the intrathoracic blood vessels and the heart.

Externally applied compression force results in sternum displacement, that displacement results in intrathoracic pressure fluctuations, which, in their turn, generate blood pressures and flow. The simulated transfers are discussed in detail below.

Displacement/Force (cm/N)

The physiologic parameters that determine this relationship are: elastic characteristics of sternum, ribcage, diaphragm, and abdomen, and the airway parameters. In the simulator chest implementation, these parameters are lumped into the (fixed) characteristics of the spring in the commercially available mannequin.

Chest Compression Pressure/Displacement ($cmH_2O$/cm)

A new device and associated software driver detect the sternum displacement in real time. The displacement then results in a (variable) Pc. The physiologic parameters that determine this relationship are the same mechanical parameters as for the Displacement/Force characteristics. A new user programmable parameter: Chest compression efficacy, summarizes the overall effect of these parameters. It thereby determines the power of the effect of chest compression (in cm) on Pc:

$$Pc = \text{Chest compression efficacy} * \text{Displacement} \qquad (1)$$

Intrathoracic Pressure/Chest Compression Pressure (mmHg/$cmH_2O$) and Lung Volume/Chest Compression Pressure (ml/$cmH_2O$)

Pc is used in conjunction with Pinus (the muscle pressure). In a semi-static situation, the intrapleural pleural pressure is in equilibrium with the chest wall pressure, the muscle pressure, and the compression pressure, FIG. 6, and is computed as follows:

$$Ppl = Pcw(Vcw) - Pmus + Pc \quad (2)$$

In equation (2), the non-linear chest wall elastance characteristics are represented by the function Pcw(Vcw), with the volume enclosed in the chest wall:

$$Vcw = Vlung + Vpl \quad (3)$$

Vlung is the lung volume, simulated by the bellows volume, and measured with an excursion sensor. Vpl is a user programmable intrapleural volume.

The intrapleural pressure Ppl acts directly on the lung, together with the elastic forces of that lung. The piston pressure Ppiston that acts on the lung bellows to simulate the effect of these pressures is computed as follows:

$$Ppiston = Plung(Vlung) - Ppl \quad (4)$$

In equation (4), the non-linear lung elastance characteristics are represented by the function Plung(Vlung). Through this model the compression pressure influences the lung volume.

These equations are repeated for left and right lungs, simulated by distinct bellows. The output variable: intrathoracic pressure Pth, is computed as the average of left and right intrapleural pressure:

$$Pth = 0.5*(P\,pl,1 + P\,pl,r) \quad (5)$$

Programmable parameters of the elastance characteristics include chest wall and lung compliances. Note that changing these (software) parameters does not change the DisplacemenVForce characteristics.

Blood Pressure and Flow/Intrathoracic Pressure

The existing HPS cardiovascular model, based on a model presented in the scientific literature, was adapted to reflect the absence of retrograde flows into the veins. See J. E. W. Beneken, B. DeWit: A physical approach to hemodynamic aspects of the human cardiovascular system. In Physical bases of circulatory transport: Regulation and exchange, editors E. B. Reeve, A. C. Guyton. Philadelphia: Saunders, 1967, pp 1–45. This model reflects the interaction between intrathoracic pressure and the circulation. Intrathoracic pressure influences the transmural pressures of the heart chambers and of the intrathoracic veins and arteries, reflecting the "cardiac pump" and "thoracic pump" hypotheses about artificial circulation through chest compression. The blood pressures can be observed, if catheters are in place while chest compression is performed. Radial and carotid pulses are automatically triggered if the level of arterial pressure is sufficient.

Gas Exchange

The blood flow that results from successful chest compression causes changes in gas exchange, notably the renewed delivery of carbon dioxide to the lungs.

Return of Cardiac Rhythm

The return of cardiac rhythm is determined by the instructor, and imposed with a cardiac rhythm override, or automatically by a model for the myocardial oxygen balance. This model results in an ischemic index. A cardiac rhythm model then determines the rhythm based on this index.

Cerebral Oxygenation

In addition, cerebral ischemic indices can be used to determine the oxygenation status of the brain hemispheres, based on arterial blood pressure, oxygen saturation of the arterial blood, time, and a cerebral ischemic sensitivity indices, summarizing such factors as resistance to brain perfusion, elevated oxygen consumption, etc. The success of resuscitation, as judged from the return of spontaneous breathing and circulation, can be based on these indices, without intervention of the simulator instructor.

Evaluation of the HPS Artificial Circulation Linked to Effective Chest Compression The simulation system of the present invention permits the following:

Chest compression results in continuous fluctuations of central venous, pulmonary artery and arterial blood pressures;

A continuous blood flow results from sustained rhythmic and deep chest compression;

Gas transport resumes on efficient chest compression, as can be observed by rising end-tidal $CO_2$;

The values of all above mentioned variables depend on rate and depth of compression;

The chest compression efficacy parameter can be used to modulate "ease of resuscitation". For high values of this parameter it is possible to generate pulse-oximeter pulsations with deep chest compression;

Rhythmic compression of the chest (80 compressions per min), at near full excursion, in asystole, with the chest compression efficacy set to 16 $cmH_2O/cm$ result in:
a cardiac output of 1.3 l/min,
arterial blood pressures of 63/22 mmHg (approximate average values of fluctuating variables),
end-tidal $CO_2$ of 18 mmHg (evaluated with patient on a ventilator); and The simulated cardiac output and end-tidal $CO_2$ are in the expected ranges.

B. Alveolar Ventilation

Also provided is a method for simulating life support procedures in real-time using a mannequin, the method comprising sensing the alveolar gas volume that results from gas pressure applied to an upper airway of the mannequin and generating a variable that corresponds to the alveolar volume or the alveolar ventilation, determining, based on a time driven script, an event driven script, a mechanical model, a mechanical model, a mathematical model or a combination thereof an appropriate physiological response to the variable corresponding to the alveolar volume or the alveolar ventilation, and based on the appropriate physiological response, actuating at least one output.

In another embodiment, the invention provides an apparatus for simulating life support procedures in real-time using a mannequin, the apparatus comprising a mannequin having an upper airway, a sensor for determining the alveolar gas volume that results from gas pressure applied to the upper airway of the mannequin and generating a variable that corresponds to the alveolar volume or the alveolar ventilation, an electronic device operable in accordance with a time driven script, an event driven script, a mechanical model, a mechanical model, a mathematical model or a combination thereof for determining an appropriate physiological response to the variable corresponding to the alveolar volume or the alveolar ventilation, and at least one output corresponding to the appropriate physiological response.

Sensing the Gas Pressures Applied to the Upper Airway

Airway pressures result in real gas pressures and flows in a pneumatic system, containing an anatomically correct upper airway, computer controlled airway resistance, and bellows representing alveolar volume with computer controlled spontaneous breathing activity and compliance. These components form a hybrid model for the influence of airway pressures. The alveolar volume is the input to the mathematical part of the simulation engine.

Mathematical Model for the Physiologic Consequences of Alveolar Gas Volume

The alveolar volume is another input variable to the mathematical model for the consequences of chest compression, as described above.

Responses

This therapeutic intervention effects, directly or indirectly, all vital systems and, therefore, the responses are identical to those listed under the Implementation for Chest Compression above.

C. Gas Composition

The present invention also presents a method for simulating life support procedures in real-time using a mannequin, the method comprising sensing the composition of inspiratory or alveolar gas and generating a variable corresponding to the gas composition, determining, based on a time driven script, an event driven script, a mechanical model, a mathematical model or a combination thereof an appropriate physiological response to the variable corresponding to the gas composition, and based on the appropriate physiological response, actuating at least one output.

In a further embodiment, the invention provides an apparatus for simulating life support procedures in real-time using a mannequin, the apparatus comprising a mannequin having an airway, a sensor positioned in fluid communication with the airway for sensing the composition of inspiratory or alveolar gas and generating a variable corresponding to the gas composition, an electronic device operable in accordance with a time driven script, an event driven script, a mechanical model, a mathematical model or a combination thereof for determining an appropriate physiological response to the variable corresponding to the gas composition, and at least one output corresponding to the appropriate physiological response.

Sensing the Composition of Inspiratory Gas

The inspired gas composition influences the gas composition in the bellows representing the alveolar space. The uptake and delivery of respiratory gases is under computer control. The alveolar gas composition is sampled using a medical gas analyzer.

Mathematical Model for the Physiologic Consequences of Alveolar Gas Composition

The alveolar gases are input variables to an uptake and distribution model that interacts with the modeled cardiovascular system to determine oxygen saturation of arterial blood.

Responses

This therapeutic intervention effects, directly or indirectly, all vital systems and, therefore, the responses are identical to those listed under the Implementation for Chest Compression above.

D. Fluid Administration

The invention also provides a method for simulating life support procedures in real-time using a mannequin, the method comprising sensing the amount and composition of administered fluid and generating a variable corresponding to the type of the fluid and the administered amount, determining, based on a time driven script, an event driven script, a mechanical model, a mathematical model or a combination thereof an appropriate physiological response to the variables corresponding to the type and the amount of the fluid, and based on the appropriate physiological response, actuating at least one output.

In yet another embodiment, the invention provides an apparatus for simulating life support procedures in real-time using a mannequin, the apparatus comprising a mannequin having a means for accepting an administered fluid, a sensor for sensing the amount and composition of administered fluid administered to the accepting means and generating a variable corresponding to the type of the fluid and the administered amount, an electronic device operable in accordance with a time driven script, an event driven script, a mechanical model, a mathematical model or a combination thereof for determining an appropriate physiological response to the variables corresponding to the type and the amount of the fluid, and at least one output corresponding to the appropriate physiological response.

Sensing the Administered Fluid Type and Composition

Fluid administration is sensed by the scanning of a bar-code on a bag of fluid with a known composition, e.g. whole blood. This volume is added to the volume in the extrathoracic compartment of the cardiovascular model.

Mathematical Model for the Physiologic Consequences of Fluid Administration

Blood pressures from the cardiovascular model play a role in the cardiac rhythm model and for the cerebral oxygenation, as described above with respect to chest compression.

Responses

This therapeutic intervention effects, directly or indirectly, all vital systems and, therefore, the responses are identical to those listed under the Implementation for Chest Compression above.

E. Intravenous Drug Administration

The invention also provides a method for simulating life support procedures in real-time using a mannequin, the method comprising sensing the administration of intravenous drugs and generating variables corresponding to the type of the drug and the administered dose, determining, based on a time driven script, an event driven script, a mechanical model, a mathematical model or a combination thereof an appropriate pharmacological response to the variables corresponding to the drug type and the administered dose, and based on the appropriate pharmacological response, actuating at least one output.

Also, the invention provides an apparatus for simulating life support procedures in real-time using a mannequin, the apparatus comprising a mannequin having a means for accepting administered intravenous drugs, a sensor for sensing the administration of intravenous drugs and generating variables corresponding to the type of the drug and the administered dose, an electronic device operable in accordance with a time driven script, an event driven script, a mechanical model, a mathematical model or a combination thereof for determining an appropriate pharmacological response to the variables corresponding to the drug type and the administered dose; and at least one output corresponding to the appropriate pharmacological response.

Sensing the Administration of Intravenous (IV) Drugs

A bar-code on a syringe identifies the drug when it is injected in an IV port. To determine the dose, the weight of the injected fluid is measured on a scale at the completion of administration. Infusion rates are communicated to pharmacokinetic models via an alphanumerical interface.

Mathematical Model for the Pharmacologic Consequences of Intravenous Drug Administration Pharmacokinetic (drug transport and elimination) and pharmacodynamic (drug effect) models determine the effects of intravenous drugs on the cardiovascular system, the respiratory system, and on neuromuscular blockade. These three systems influence the cardiac rhythm model and cerebral oxygenation, via blood pressures, and blood gases. The cardiac rhythm model and the model for cerebral oxygenation are described above with respect to chest compression.

Responses

This therapeutic intervention effects, directly or indirectly, all vital systems and, therefore, the responses are identical to those listed under the Implementation for Chest Compression above.

It will be apparent to those skilled in the art that modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method for simulating life support procedures in real-time using a mannequin having at least an abdomen and a thorax, the method comprising:
   a) sensing displacement of at least one of the thorax or the abdomen of the mannequin and generating a displacement signal corresponding to an extent of the displacement;
   b) determining, using a model-driven simulator, a physiological blood flow corresponding to blood flow through a human heart in response to the displacement signal; and
   c) actuating at least one output based on the determined physiological blood flow.

2. The method of claim 1, wherein the model-driven simulator comprises at least one of a mechanical model, a mathematical model, a combination of a mathematical model and a mechanical model.

3. The method of claim 2, wherein the model-driven simulator further comprises at least one of a time driven script, an event driven script, and a combination of a time driven script and an event driven script.

4. The method of claim 2, wherein determining the physiological blood flow further comprises accounting for elastic characteristics of at least one of a sternum, a rib-cage, a diaphragm, or an abdomen.

5. The method of claim 1, further comprising computing an intrathoracic pressure from the displacement signal, and wherein the computed intrathoracic pressure is used to determine the physiological blood flow.

6. The method of claim 5, further comprising supplying a lung volume and a simulated respiratory muscle pressure, wherein the intrathoracic pressure is computed from at least one of the displacement signal, the lung volume, and the simulated respiratory muscle pressure.

7. The method of claim 6, wherein the lung volume is simulated.

8. The method of claim 1, further comprising deriving, in response to the displacement signal, at least one physiological variable selected from the group comprising: a simulated electrocardiogram, a simulated heart sound, a simulated cardiac output signal, a simulated gas pressure and flow in and out of a trachea of the mannequin, a simulated breath sound, a simulated end-tidal $CO_2$, a simulated oxyhemoglobin saturation, a simulated arterial gases, a simulated venous blood gases, a simulated skin color, a simulated thumb twitch, a simulated electroencephalogram, and a simulated eye sign.

9. The method of claim 1, further comprising determining, in response to the determined physiological blood flow, at least one physiological variable selected from the group comprising: a simulated electrocardiogram, a simulated heart sound, a simulated cardiac output, a simulated end-tidal CO2, a simulated oxyhemoglobin saturation, a simulated arterial blood gas, a simulated venous blood gas, a simulated skin color, a simulated thumb twitch, a simulated electroencephalogram, and a simulated eye sign.

10. The method of claim 1, further comprising deriving, in response to the displacement signal, a simulated palpable pulse, wherein the simulated palable pulse is generated only if arterial pressure levels exceed a predetermined threshold.

11. The method of claim 10, wherein the simulated palpable pulse is at least one of a simulated carotid pulse, a simulated femoral pulse, and a simulated radial pulse.

12. The method of claim 1, further comprising deriving, in response to the determined physiological blood flow, a simulated intravascular blood pressure.

13. The method of claim 12, wherein the simulated intravascular blood pressure is at least one of the intravascular blood pressures selected from the group comprising: simulated intrathoracic arterial, extrathoracic arterial, vessel rich, muscle, skin, fat, extrathoracic venous, intrathoracic venous, right atrial, right ventricular, pulmonary arterial, lung tissue, pulmonary venous, left atrial, and left ventricular blood pressures.

14. The method of claim 1, further comprising determining, in response to the determined physiological blood flow, a simulated palpable pulse, wherein the simulated palpable pulse is generated only if arterial pressure levels exceed a predetermined threshold.

15. The method of claim 14, wherein the simulated palpable pulse is at least one of a simulated carotid pulse, a simulated femoral pulse, and a simulated radial pulse.

* * * * *